United States Patent [19]

Kuroda et al.

[11] Patent Number: 4,487,784
[45] Date of Patent: Dec. 11, 1984

[54] LIMESTONE-GYPSUM FLUE GAS DESULFURIZATION PROCESS

[75] Inventors: Hiroshi Kuroda; Tsukasa Nishimura; Taiki Hashimoto; Masakatsu Nishimura; Osamu Kanda; Shigeru Nozawa, all of Kure, Japan

[73] Assignee: Babcock-Hitachi Kabushiki Kaisha, Tokyo, Japan

[21] Appl. No.: 350,598

[22] Filed: Feb. 22, 1982

[51] Int. Cl.³ .................. C01F 11/46; C01B 17/00
[52] U.S. Cl. .................. 423/555; 423/242; 106/109; 106/110
[58] Field of Search .................. 423/242 A, 555; 106/109, 110

[56] References Cited

U.S. PATENT DOCUMENTS

| | | | |
|---|---|---|---|
| 2,021,548 | 11/1935 | Goodeve | 423/242 A |
| 2,080,779 | 5/1937 | Lessing | 423/242 A |
| 3,808,321 | 4/1974 | Fukui et al. | 423/242 A |
| 3,903,243 | 9/1975 | Atsukawa et al. | 423/555 |
| 3,995,006 | 11/1976 | Downs et al. | 423/242 A |
| 4,080,427 | 3/1978 | Fujita et al. | 423/242 A |
| 4,150,096 | 4/1979 | Welms et al. | 423/242 A |
| 4,250,152 | 2/1981 | Biedell et al. | 423/242 A |
| 4,364,910 | 12/1982 | Willett et al. | 423/242 A |

FOREIGN PATENT DOCUMENTS

| | | | |
|---|---|---|---|
| 46-31124 | 9/1971 | Japan | 423/555 |
| 49-122495 | 11/1974 | Japan | 423/555 |
| 50-159898 | 12/1975 | Japan | 423/555 |
| 53-66894 | 6/1978 | Japan | 423/555 |
| 53-108896 | 9/1978 | Japan | 423/555 |
| 53-137871 | 12/1978 | Japan | 423/555 |
| 54-9194 | 1/1979 | Japan | 423/555 |
| 54-99074 | 8/1979 | Japan | 423/555 |
| 55-109225 | 8/1980 | Japan | 106/109 |
| 55-113620 | 9/1980 | Japan | 423/555 |

Primary Examiner—Gary P. Straub
Attorney, Agent, or Firm—Beall Law Offices

[57] ABSTRACT

A flue gas desulfurization process capable of producing a high purity gypsum and also making equipment employed as minimum as possible is provided, which process comprises the steps of cooling and dedusting flue gas containing $SO_x$; contacting the cooled gas with a slurry containing limestone to remove $SO_x$ by absorption and also form $CaSO_3$; controlling the pH of the resulting slurry and then blowing air therein to form gypsum; and separating gypsum from the resulting slurry. As a modification of the above process, the slurry of the above second absorption step is further fed to the above first cooling step where unreacted limestone and $SO_x$ are reacted to form $CaSO_3$.

31 Claims, 15 Drawing Figures

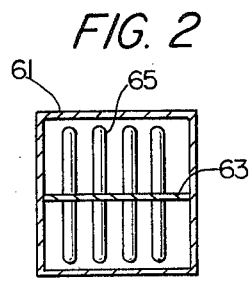
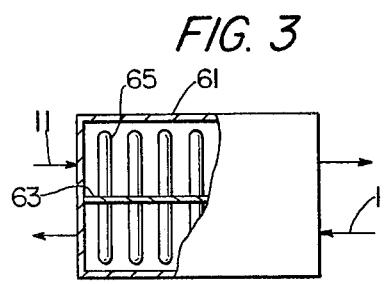
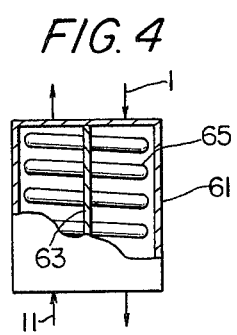
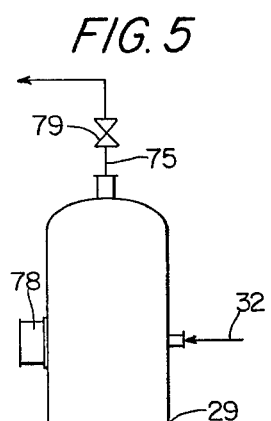
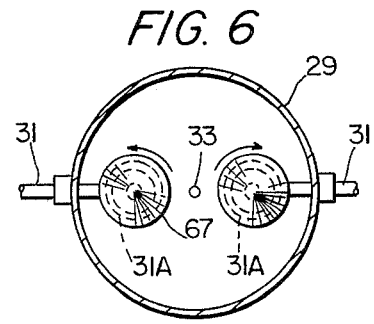
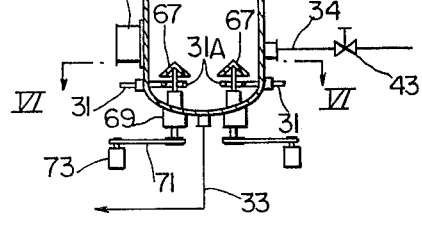

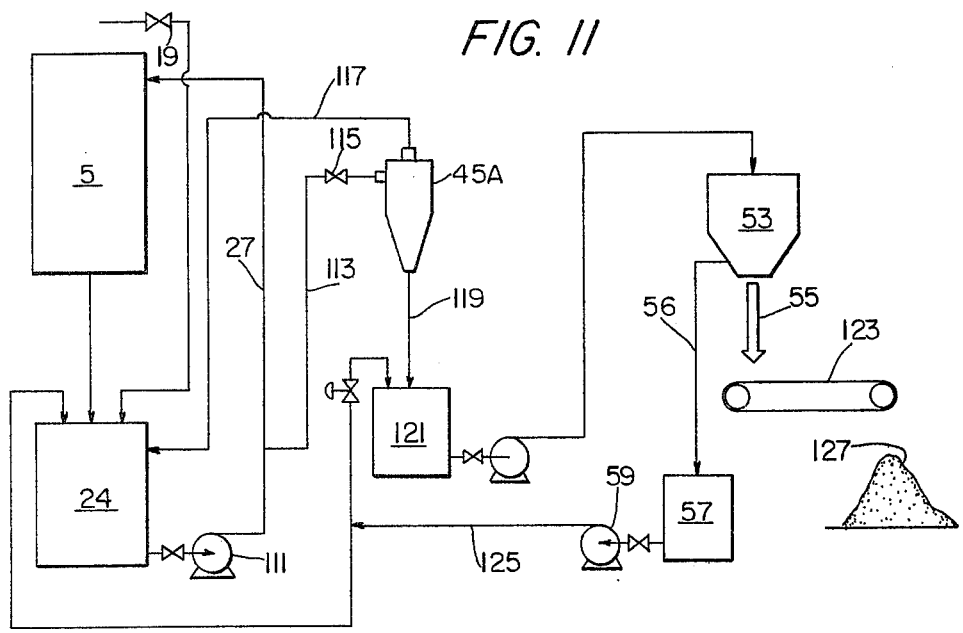

LIMESTONE-GYPSUM FLUE GAS DESULFURIZATION PROCESS

BACKGROUND OF THE INVENTION

1. Field of the Invention

This invention relates to a limestone (lime)-gypsum flue gas desulfurization process. More particularly it relates to a wet type flue gas desulfurization process by removing sulfur oxides ($SO_x$) contained in flue gases, with limestone ($CaCO_3$) or caustic lime ($Ca(OH)_2$) as an absorber, and at the same time recovering gypsum ($CaSO_4.2H_2O$) as byproduct, and apparatus employed therefor.

According to the above desulfurization process, sulfur oxides ($SO_x$) (usually $SO_2$ or $SO_3$) contained in flue gases are converted into gypsum which is chemically stable and utilizable, with $CaCO_3$, $CaO$ or $Ca(OH)_2$ as raw material, which are abundantly present in nature and cheaply available, and the flue gases are made harmless.

2. Description of the Prior Art

Conventional flue gas-desulfurization processes comprise a cooling step, and absorption step, a concentration step for slurry of gypsum formed in the absorption step, and an exhaust gas-heating step. Exhaust gas is led to the cooling step wherein it is partly desulfurized and at the same time cooled and dedusted. It is then led into an absorption tower wherein it is further desulfurized. The resulting gas is sent to the exhaust gas-heating step, heated therein and delivered. On the other hand, a slurry containing limestone and lime is led to the absorption step wherein it absorbs $SO_x$ and byproduces $CaSO_3$ and $Ca(HSO_3)$. A portion of the resulting slurry containing unreacted $CaCO_3$ and $Ca(OH)_2$ is sent to the cooling step wherein the amounts of unreacted $CaCO_3$, etc. are reduced. Further, portions of the byproducts $CaSO_3$ and $Ca(OSO_3)_2$ are oxidized in the absorption and cooling steps to form gypsum ($CaSO_4$). The slurry used in the cooling step is sent to the concentration step wherein it is separated into water and concentrated solids, the water being reused, and the concentrated solids ($CaSO_3$, $Ca(HSO_3)_2$, and $CaSO_4$) being stored in a pond close to the concentration step. In this case, water resulting from precipitation of the solids in the pond may be reused.

The above conventional processes, however, raise such problems that since the byproducts are a mixture of $CaSO_3$, $Ca(HSO_3)_2$ and gypsum, and partly contain unreacted $CaCO_3$, they cannot be effectively utilized even if recovered, and also since fine particles of $CaSO_3$ and $Ca(HSO_3)_2$ having a particle size of several $\mu m$ are present in a large amount in the slurry in the concentration step, the settling property is so poor that it is necessary to make the concentration apparatus larger. Further, in the case where a slurry of Ca compounds is used as an absorbing agent, since the byproducts ($CaSO_3$ and $CaSO_4$) cause scaling, it is necessary to take a countermeasure therefor.

From such a standpoint, a process has been desired which is capable of recovering gypsum as byproduct and also recovering the gypsum according to various uses, and also which causes no scaling, etc., is highly reliable and is very efficient employing as minimum equipments as possible, from the viewpoint of a process efficiency.

SUMMARY OF THE INVENTION

An object of the present invention is to provide a process which is capable of recovering various grades of gypsum, according to its uses, in the desulfurization apparatus for exhaust gases, and an apparatus therefor. Another object of the present invention is to provide a highly reliable process and an apparatus therefor.

Still another object of the present invention is to provide a flue gas desulfurization process and apparatus therefor wherein equipments employed therefor are made as minimum as possible from the standpoint of efficiency of the process.

Other objects will be apparent from the following description.

A first process proposed in the present invention comprises the following steps:

a cooling step wherein flue gases containing $SO_x$ are cooled, dedusted and freed from acidic gases such as HCl, HF;

an absorption step wherein the flue gas cooled in the cooling step is contacted with slurry containing limestone (or lime) to absorb and remove the $SO_x$ contained in the gas;

a pH-adjusting step of adjusting the pH of the resulting slurry containing $CaSO_3$ and $Ca(HSO_3)_2$ formed in said absorption step;

an oxidation step of contacting the resulting slurry from said pH-adjusting step with air to oxidize it and thereby form gypsum;

a concentration step of concentrating the resulting slurry containing gypsum from said oxidation step;

a step of adjusting the concentration of the gypsum-containing slurry obtained in said concentration step;

a centrifugal separation step of separating gypsum from the concentrated gypsum-containing slurry;

a step of treating the effluent discharged from said cooling step; and a step of treating the effluent discharged from said concentration step.

The above first process will hereinafter be referred to as soot (dust) separation system.

A second process of the present invention is characterized in that the slurry of the absorption step in the above first process is further fed to the cooling step in the process, and in this cooling step, unreacted limestone and $SO_x$ are reacted together to form calcium sulfite.

According to this second process, mixing-in of soot or dust is unavoidable in the succeeding gypsum production step; hence this process will hereinafter be referred to as soot (dust) mixing process.

In this soot mixing process, the pH control and the oxidation of calcium sulfite may be carried out in the slurry-circulating system of the cooling step to produce gypsum instead of employing the pH-control tank and the oxidation tower in the gypsum production.

In the above processes, it is preferable that the pH in the pH-adjusting step is adjusted to 4 to 5, the amount of air flown in said oxidation step is 1.5 to 3 times its theoretical value, and a filtrate containing fine particles of gypsum having passed through a centrifugal separator in the centrifugal separation step is returned to the absorption system of the absorption step to make the gypsum concentration in the slurry in said absorption step 5% by weight or higher.

BRIEF DESCRIPTION OF THE DRAWING

FIG. 2 shows the front cross-sectional view of a heater for reheating the gas treated according to the process of the present invention.

FIG. 3 shows the front cross-sectional view of a heater as another embodiment, for reheating the gas.

FIG. 4 shows the front cross-sectional view of a heater as still another embodiment, for reheating the gas.

FIG. 5 shows a partly cut-away cross-sectional view illustrating an embodiment of the oxidation tower employed in the process of the present invention.

FIG. 6 shows a cross-sectional view of the oxidation tower of FIG. 5 cut along the line VI—VI and viewed in the arrow mark direction.

FIG. 7 shows a partly cross-sectional view illustrating the details of a rotor for agitation, employed in the oxidation tower of FIG. 5.

FIG. 11 shows a schematic diagram illustrating the gypsum recovery process in the case where a liquid cyclone is employed as the solid-liquid separator in the process of the present invention.

FIG. 12 shows a schematical cross-sectional view of the centrifugal separator employed in the process of the present invention.

FIG. 13 shows a cross-sectional view of the centifugal separator of FIG. 12 cut along the line XII—XII and viewed in the arrow mark direction.

DETAILED DESCRIPTION OF THE INVENTION

Figure 1:
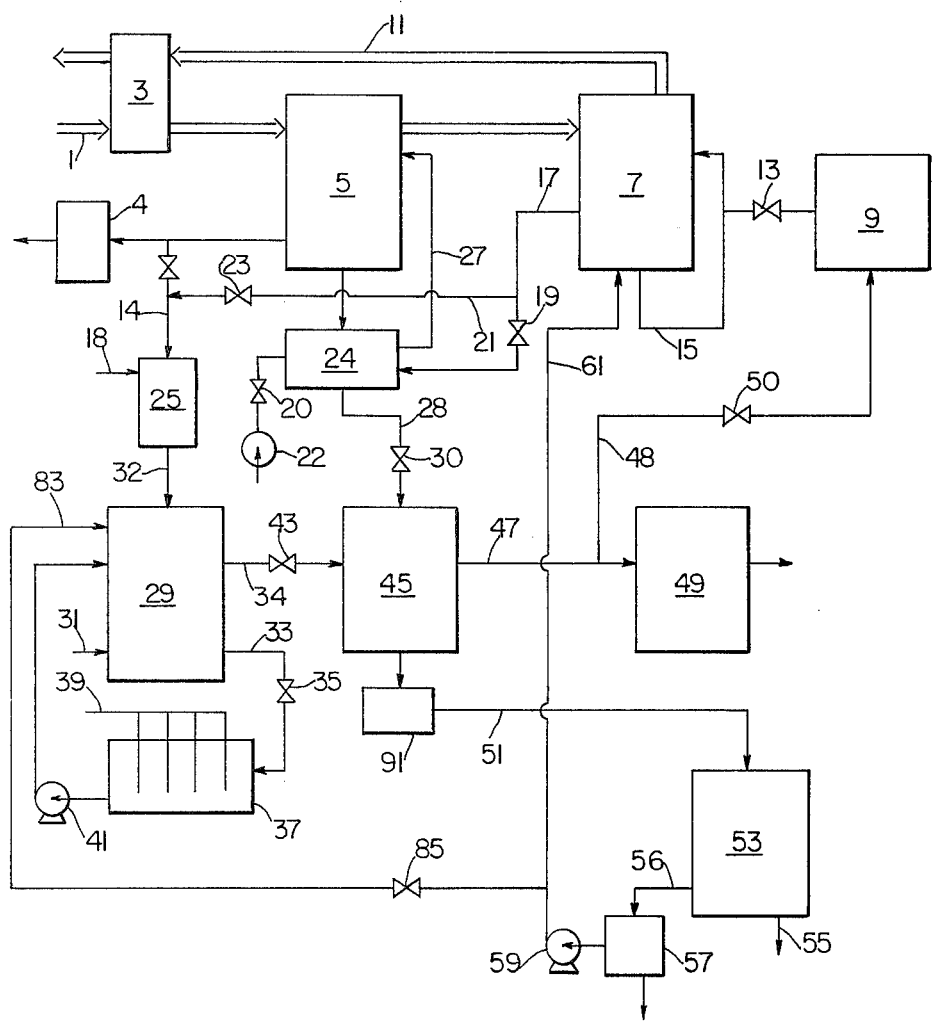
FIG. 1 shows a schematic diagram illustrating the whole of the limestone-gypsum flue gas desulfurization process of the present invention.

The whole process of the limestone (lime)-gypsum flue gas desulfurization of the present invention will be illustrated by way of FIG. 1.

Referring to FIG. 1, a flue gas 1 containing sulfur oxides is passed through a gas heater 3 and led into a cooling tower 5 where dust contained in the flue gas is removed and at the same time the gas is cooled. It is then led into an absorption tower 7 where it is contacted with an absorber (limestone) slurry fed from an absorber slurry tank 9 and the sulfur oxides contained in the flue gas are reacted with the absorber and removed in the form of calcium sulfite. The resulting clean gas 11 is passed through the gas heater 3 where it is reheated through heat-exchange with the high temperature flue gas 1 and discharged to the atmosphere whereby white smoke is prevented from formation. On the other hand, the absorber slurry is fed from the tank 9 through a valve 13 and an absorber slurry-circulating line 15 to the absorption tower 7. In this absorption tower 7, the flue gas is contacted with the absorber slurry to react as expressed by the following equations with SO$_x$ contained in the flue gas, which is removed in the form of CaSO$_3$ or Ca(HSO$_3$)$_2$:

$$CaCO_3 + SO_2 + \tfrac{1}{2}H_2O \rightarrow CaSO_3 \cdot \tfrac{1}{2}H_2O + CO_2 \qquad (1)$$

$$CaCO_3 \cdot \tfrac{1}{2}H_2O + SO_2 + \tfrac{1}{2}H_2O \rightarrow Ca(HSO_3)_2 \qquad (2)$$

The resulting slurry containing calcium sulfite and unreacted limestone, formed in the absorption tower 7 is usually fed via a line 17, a valve 19 and a slurry-circulating tank 24 to the cooling tower 5, but, in the case where the flue gas has a high dust concentration as the one from coal combustion boilers, the slurry may not be passed through the cooling tower 5, but passed through the line 17, a branch line 21 and a valve 23 and fed directly to a pH-adjusting tank 25, whereby it is possible to avoid contamination of the byproducts due to the dusts, and also avoid corrosion of the equipment downstream of the absorption tower due to the acidic gas ions.

The slurry containing calcium sulfite is adjusted by sulfuric acid fed via the line 18 in this pH-adjusting tank 25 to a PH required for the oxidation, and then led to an oxidation tower 29 where the slurry is oxidized by air introduced through a line 31 to form gypsum (CaSO$_4$·2H$_2$O), as shown in the following equations:

$$Ca(HSO_3)_2 + \tfrac{1}{2}O_2 + 2H_2O \rightarrow CaSO_4 \cdot 2H_2O + H_2SO_3 \qquad (3)$$

$$CaSO_3 \cdot \tfrac{1}{2}H_2O + \tfrac{1}{2}O_2 + 3/2H_2O \rightarrow CaSO_4 \cdot 2H_2O \qquad (4)$$

The oxidation reaction shown by the above equations occurs due to dissolution of oxygen in air into the slurry. Further, the solubility of CaSO$_3$ greatly varies depending on the pH of the slurry, and the lower the pH, the solubility becomes the higher. However, the solubility of oxygen in the slurry is about 6 ppm at normal temperatures and normal pressures; hence even if the pH is lowered so much, the oxidation rate of CaSO$_3$ does not rise so much, but contrarily dissipation of sulfuric acid is brought about.

Figure 14:
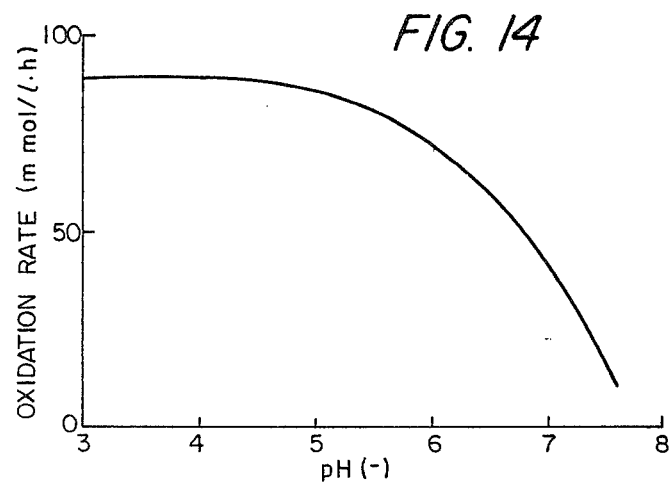
FIG. 14 shows a relationship between the pH and the oxidation rate of the CaSO$_3$ slurry.

FIG. 14 shows a relationship between the pH and the oxidation rate of the CaSO$_3$ slurry, where it is is seen that the pH of the slurry is preferably 5 or lower, most preferably 4.5 to 3.5. In the oxidation tower 29, there is often formed S$_2$O$_6^{2-}$ (dithionic acid) which is a main cause of the COD (Chemical Oxygen Demand) of the desulfurization effluent, and if the pH at the time of the oxidation is too low, the amount of the acid formed increases. Thus, it is also possible to detect the pH at the exit of the oxidation tower and thereby adjust the pH in the pH-adjusting step to e.g. 5 to 6. The theoretical value of oxygen fed to the oxidation tower can be calculated from the amount of CaSO$_3$ at the inlet of the oxidation tower, and also the oxidation rate can be raised up by increasing the amount of air. On the other hand, the particle size of gypsum by byproduced is influenced by the oxidation rate, and the higher the oxidation rate, the particle size the finer. Thus, when the grade of the byproduct is taken into account, it is desirable to introduce air in an amount in the range of 1.5 to 3 times the theoretical amount of air.

In the oxidation tower 29, the slurry containing calcium sulfite is mixed with air with stirring, but in the case where a scale build-on or such another trouble that interrupts introduction of air from line 31 occurs in this tower, the slurry is withdrawn through a line 33 and a valve 35 into an urgent blow-down tank 37 where air is vigorously blown in the slurry through a line 39 to prevent the slurry from sedimentation or solidification. The slurry after this agitation is returned to the oxidation tower 29 by means of a pump 41.

The urgent blow-down tank 37 may also be so operated that the slurry from the circulation tank 24 belonging to the cooling tower or the circulating slurry from the absorption tower can be maintained therein, and if necessary, it is possible to return these slurries, after blowing, to the original circulation system by means of a pump 41.

The slurry in the oxidation tower 29 is then led via a valve 43 into a gypsum concentration vessel 45 where the slurry is separated into a concentrated slurry and a clarified water. This clarified water is led via a line 47 into a waste water disposal apparatus 49 where it is subjected to a softening treatment by adding sodium carbonate, or to a thionic acid ion decomposition treatment. On the other hand, the concentrated slurry after adjusting its concentration, is led via a tank 91 and a line 51 into a centrifugal separator 53 where the slurry is subjected to solid-liquid separation. The discharge liquor line 47 from the concentrating vessel is provided with a branch 48 through which a portion of the clarified water is returned via a valve 50 to the absorber slurry tank 9 and used for controlling the limestone concentration in the tank.

In the case where the amount of sulfur oxides contained in the flue gas is relatively small, the oxidation tower 29 is not employed, but air is blown by means of a compressor 22 via a valve 20 into a slurry-circulating tank 24 for the slurry of the cooling tower 5 where an oxidation treatment may be carried out. The oxidized circulating slurry of the circulation system is fed via a branch 28 and a valve 30 into the vessel for gypsum concentration 45. In this case, the slurry contained in the slurry-circulating tank 24 for the slurry of the cooling tower 5 is adjusted to pH of 5 or less.

The gypsum separated at the centrifugal separator 53 is withdrawn via a line 55, and the clarified water is led via a line 56 into a tank 57 from which it may be discharged to the outside. Further, a portion of the clarified water may be returned by means of a pump 59 from the tank 57 via a line 61 into the absorption tower 7 where fine particles of gypsum contained in the clarified water are utilized as seed crystals for preventing scaling due to gypsum in the absorption tower 7 or the cooling tower 5.

It is also possible to return the slurry at the exit of the oxidation tower or the concentrated gypsum slurry at the exit of the concentration vessel to the absorption system to thereby prevent the scaling due to gypsum in the absorption system, but most of the gypsum particles contained in these slurries are fully grown crystals; hence they are not effective as seed crystals so much. On the other hand, the gypsum particles contained in the clarified water from the centrigufal separator are those having passed through a filter cloth (or wire gauze) of the centrifugal separator; hence these gypsum particles are small in the particle size and most of them are ungrown fine crystals (nuclei). Thus they are suitable as crystal seeds. With regard to the amount of the above clarified water to be returned to the absorption system, it is desirable to adjust the gypsum concentration in the slurries of the absorption system and the cooling system to 5% by weight or higher in order to exhibit the effectiveness of seed crystals. The amount of the clarified water to be ultimately returned to the absorption system is determined in relation to the amount of $CaSO_3$ and $Ca(HSO_3)_2$ to be oxidized by $O_2$ in the flue gas in the absorption system.

In the case of the soot (dust) separation system where the slurry containing $CaCO_3$ is not circulated to the cooling tower 5, but water (circulating water) is circulated to thereby remove the dust and acidic gas contained in the flue gas, the circulating water of the cooling tower 5 is sent to the clarified water-treating apparatus 4 wherein the water is subjected to treatment such as dust removal, settling separation of heavy metals by means of pH adjustment, etc., whereby the water is discharged as a harmless clarified water. However, according to such a system, while a high grade of gypsum is obtained, solids such as dust, heavy metals, etc. are discharged as mentioned above. Thus, it is possible to provide an alternative process wherein a portion of the concentrated gypsum slurry is withdrawn from the line 51 and this portion is mixed with a slurry obtained by adding $CaCO_3$ and $Ca(OH)_2$ to the water discharged from the cooling tower 5, followed by pH adjustment, in a definite amount, to recover a material available as gypsum, through the grade of this material is low, whereby discharge of dust, heavy metals, etc. from the apparatus 4 is prevented.

Next, the respective equipments employed in the above-mentioned process of the present invention will be described below.

For the gas heater 3, indirect heating type heat-exchangers having heat pipes as heat-exchange elements as shown in FIGS. 2 and 3 are preferably employed. Heaters shown in the Figures comprise a casing 61, a partition plate 63 dividing the space in the casing in parallel to the gas flow directions 1 and 11 and a plurality of heat pipes 65 penetrating the partition plate 63. The heat pipes 65 contains a condensible heating medium. The partition plate 63 and the heat pipes 65 are tightly fixed to each other so as not to have any gap therebetween. Low temperature gas 11 after desulfurization is passed through the upper passage formed by the above partition 63, while untreated high temperature gas 1 is passed through the lower passage. This untreated high temperature gas 1 imparts heat to the heat pipes 65, and the medium inside the heat pipes 65 is vaporized by this heat, moves upwards due to the pressure difference inside the pipes, condenses at the upper part of the pipes and imparts the resulting heat of condensation to the low temperature gas 11.

FIG. 4 shows another embodiment of the gas heater 3. A casing 61 is longitudinally partitioned by a partition plate 63 and heat pipes 65 are slantly arranged in the lateral direction. The low temperature gas 11 is passed upwards and the unreacted high temperature gas, downwards. In this case, in order to make easier the movement of the medium inside the heat pipes 65, the end parts of the heat pipes on the side of the high temperature gas 1 are made lower than the other end parts thereof.

In the above embodiment, if there is no fear of clogging due to dust, employment of finned heat pipes can further improve the heat transfer efficiency.

According to the above embodiments, since two kinds gas flows are completely partitioned, there is neither gas leakage as observed in conventional Ljungstroem type heat-exchanger, nor reduction in the percentage desulfurization of desulfurization apparatus. It is possible to make the clean exhaust gas passing through the heat exchanger not to be contaminated by the dusts contained in the flue gas to prevent the exhaust gas from re-pollution. Further, since the percentage heat-exchange is very high in heat pipes, it is possible to make the whole of the heat-exchanger smaller. Furthermore, when the heat pipes are roughly arranged, it is also possible to prevent dust, etc. contained in the flue gas from adhesion; thus it is possible to reduce the draft loss and the running cost of desulfurization apparatus.

Figure 15:
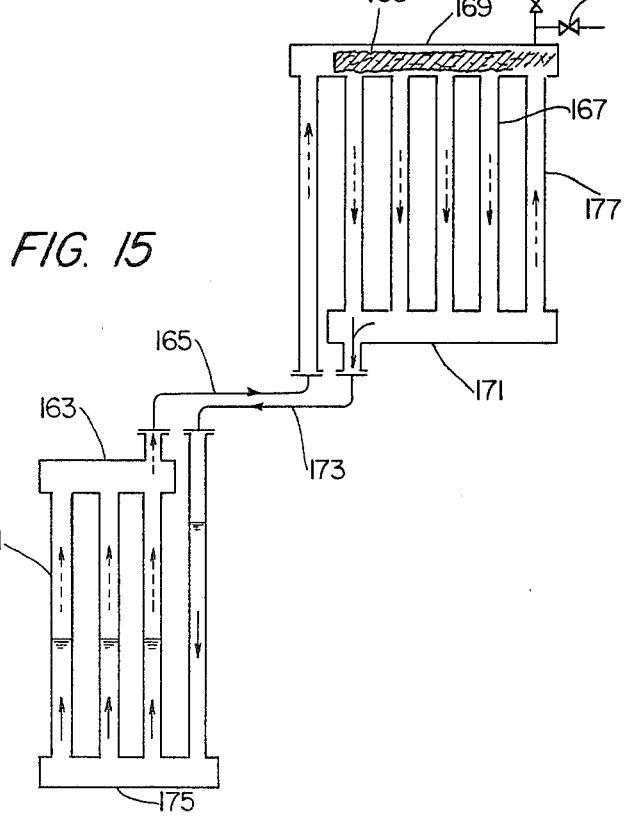
FIG. 15 shows a schematic cross-sectional view of heat pipes employed in a heater for reheating the exhaust gas treated according to the present invention.

FIG. 15 shows another embodiment of heat pipes employed in a gas heater 3 wherein the heat pipes are separately arranged to form those on the higher temperature side and those on the lower temperature side. In this figure, the heat pipes on the higher temperature side 161 are connected via an upper header 163 located above the pipes and a connecting pipe (pipe for ascending vapor) 165, to an upper header 169 located above the heating pipes on the lower temperature side 167, located above the header 163. On the other hand, a lower header 171 below the heat pipes 167 is connected via a connecting pipe (pipe for descending liquid) 173, to a lower header 175 below the heating pipes on the higher temperature side 161. The header 169 is filled with a filler 168 for promoting the condensation of steam. The heat pipes on the higher temperature side 161 and those on the lower temperature side 167 are separately arranged in the duct through which the higher temperature gas passes, and a duct through which the lower temperature gas passes, respectively. A condensible liquid such as water is sealed in the heat pipes on the higher temperature side 161, while keeping a definite level as shown in the Figure. This liquid is heated and vaporized by the higher temperature gas passing through the outside of the pipes. The resulting vapor passes through the connecting pipe 165 and moves to the heat pipes on the lower temperature side 167 wherein the vapor is cooled and condensed by the lower temperature gas passing through the outside of the pipes to effect heat exchange. The resulting condensate is collected in the header 171 and then returned via the liquid-descending pipe 173 to the lower header 175 below the heating pipes on the higher temperature side 161. While the above vaporization and condensation are repeated, heat exchange is carried out between the gas flowing through the duct on the higher temperature side and that on the lower temperature side. In addition, a heating pipe 177 among those on the lower temperature side constitutes a gas-separating pipe from which a non-condensible gas is discharged via the upper header 169 and then a valve 179.

As for the above-mentioned separation-type heat pipes, since the duct on the higher temperature side are separately arranged, heat transfer for a long distance becomes possible. Further, it is unnecessary to provide a complicated piping so that ducts containing heat pipes may be adjacent to each other, whereby it is possible to reduce pressure drop due to the ducts. Further, since the pipes on the higher temperature side and those on the lower temperature side are separated, and placed independently from each other, it is easy to choose the materials and shapes of the respective pipes. Their maintenance is also easy.

The cleaned gas leaving the absorption tower 7 is reheated in the heater 3 utilizing the waste heat, without employing any external heat source such as fuels, and it is possible to prevent white smoke from discharging from stacks.

In the present invention, in the case where it does not matter even if a small portion of the dust contained and the flue gas is mixed in gypsum as product, the absorber liquor (limestone slurry) is fed from the absorption tower 7 via the line 17, the valve 19 and the slurry-circulating tank 24 into the cooling tower 5 (this process is referred to as soot-mixing one as described above). Next, a portion of the slurry of the cooling tower 5 is led via a line 14 into the pH-control tank 25. Further, in the case where the dust contained in the flue gas is not desired to be mixed in gypsum as product, the slurry is fed via the exit line 17 of the absorption tower 7 and the valve 23, directly into the pH-control tank 25 (this process is referred to as soot-separating one as described above).

Preferable embodiments of the oxidation tower 29 are shown in FIGS. 5 and 6. The bottom part of the oxidation tower 29 is provided with atomizers 69 each having a conical rotor 67, and the rotating shaft of the rotor 67 is connected to a motor 73 through a pulley and a belt 71 outside the tower. Just below the rotor 67 of the respective atomizers 69 is provided a ring header having nozzles 31A opened toward the rotor, and compressed air is supplied through an air-introducing line 31 into the nozzles 31A.

A line for discharging oxidized gypsum slurry 34 is also provided on the side wall of the lower part of the tower. On the other hand, the upper part of the tower is provided with a raw material slurry-feeding line 32 extending from the pH-control tank 25, and at the top part of the tower is provided a gas-exhaust line 75. The line 33 is a drainage line. Numerals 77 and 78 indicate manholes, and 79, a valve for gas-exhaust from the top part of the tower.

In the oxidation tower having the above construction, the slurry containing $CaSO_3$ and $Ca(HSO_3)_2$ is fed via the line 32 at the upper part of the tower, while compressed air is introduced through the nozzles 31A at the lower part of the tower. The air becomes fine air bubbles around the rotors 67 by means of the rotating power thereof, then the bubbles ascend inside the tower while they are uniformly dispersed and contacted with the slurry to oxidize $CaSO_3$ and a $Ca(HSO_3)_2$ contained therein to form $CaSO_4.2H_2O$.

In the above operation, it is desirable to raise the pressure inside the tower up to about 1.5 atmospheres or higher (preferably about 2 atmospheres) to promote the oxidation reaction. Further, it is also desirable to make the quantity of the compressed air fed via the line 31, about 1.5 times or more the theoretical air quantity required to oxidize $CaSO_3$ and $Ca(HSO_3)_2$. Exhaust gas of the oxidation tower is discharged from the top part of the tower via a line 75 and a valve 79 to the outside, while the slurry containing gypsum is discharged through the line 34 at the lower part of the tower, and further sent via a valve 43 to a solid-liquid separator 45. When the slurry is discharged through the line 34, the valve 43 is adjusted so that the liquid level of the slurry in the oxidation tower can be kept constant.

By making the shape of the rotor 67 of the atomizer 69 conical, air bubbles are uniformly dispersed by centrifugal force in the radial direction of the tower by the medium of the slurry flowing along the surface of the rotor, as shown by the broken lines each having an arrow mark in FIG. 7, to effect a good gas-liquid contact. Further, since the end part of the rotor is covered by air bubbles, its resistance is reduced and its rotating power is also reduced. Furthermore, since the rotor 67 has no hole, its structure is simple and nevertheless its performance is superior. In addition, the shape of the rotors 67 may be elliptically conical, version-conical, etc. besides the conical shape as shown in the figure (e.g. having a vertical angle of 90°).

Figure 8:
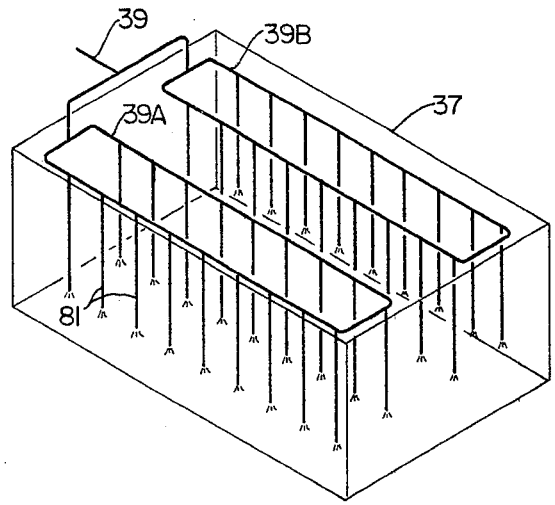
FIG. 8 shows a perspective view of the urgent blow tank attached to the oxidation tower.

The details of the urgent blow-down tank 37 connected to the oxidation tower 29 in the present invention are shown in FIG. 8. Referring to this figure, at the upper part of the tank 37 are provided main pipes 39A, 39B each connected to a mother pipe 39, and from the respective main pipes are branched a plurality of vertical pipings 81 for slurry agitation so that their ends are apart from the bottom part of the vessel with a slight clearance. Compressed air is passed through pipes 39, 39A, 39B and vertical pipings 81 and spouted from the tip ends of the pipings 81 toward the bottom part of the tank 37. As the fluid to be spouted, air may be replaced by the slurry itself. The slurry inside the tank is vigorously agitated by blowing such air or the slurry itself into the slurry. Even if the slurry flows back into the vertical pipings 81, its resistance is very small, and when the air feed is stopped, the solids contained in the slurry naturally settle toward the outside of the pipings; hence no clogging occurs. Thus even when the quantity of air fed or the pressure of the slurry fed is not increased, it is possible to carry out a very effective agitation. Further, since it is not necessary for the pipings to be provided with small holes or nozzles, the apparatus has a simple construction to become economical.

If the slurry temperature is increased by the oxidation reaction of calcium sulfite inside the oxidation tower 29 to raise a problem of corrosion of the respective equipments and pipings, then it is possible to inhibit the temperature rise by supplying water through the line 83 (FIG. 1) into the oxidation tower 29 to thereby increase the water content in the slurry (e.g. to 92 to 94% by weight). As for the supplement water, it is possible to introduce the filtrate water from the centrifugal separator 53 via a branch from the line 61 and a valve 85.

In the present invention, as for the gypsum concentration vessel (solid-liquid separator) 45 for separating gypsum from the gypsum-concontaining slurry, an agitation type thickner or a liquid cyclone may be preferably employed. With respect to the centrifugal separator 53 arranged downstream of the solid-liquid separator 45, if it is aimed to obtain a good quality gypsum as the byproduct, it is desired to severely and accurately detect and control the concentration and quantity of the slurry fed to the centrifugal separator 53 which is disposed after the solid-liquid separator 45 (e.g. to a range from 15 to 25% by weight).

Figure 9:
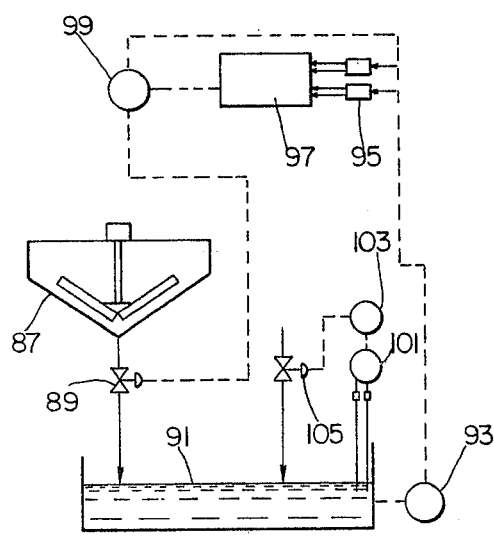
FIG. 9 shows a schematic diagram illustrating the method for controlling the concentration of the gypsum slurry obtained in the solid-liquid separator in the process of the present invention.

FIG. 9 shows a view illustrating a method for controlling the quantity and concentration of slurry in the case where a thickner 87 is employed as the solid-liquid separator 45.

The gypsum slurry is concentrated by settling in the thickner 87 and at the same time the concentrated slurry is discharged via a control valve 89 into a concentrated slurry tank 91. In this case, as for the method of discharging the slurry into the slurry tank 91, it is desirable to employ a system wherein the level of the slurry in the slurry tank 91 is detected by a level transmitter 93 and signals of open or closed are transmitted to the above control valve 89 by a monitor switch 95. The duration of the above open or closed of the control valve 89 can be optionally adjusted by a timer provided in a pulsing circuit 97 which receives the signals from the level transmitter 93 and the monitor switch 95. Namely, the pulsing circuit 97 corresponds to a circuit for carrying out the interlock of the control valve 89, etc.; thus the duration of open or closed of the control valve 89 can be optionally controlled by setting the timer. Further, to the pulsing circuit 97 is connected a level-controller 99, which allows the open or close control of the valve 89 to be optionally changed either to an automatic control or to a manual one. Namely, when the controller 99 is set to an automatic control, it is possible to automatically open or close the control valve 89 repeating "open" or "closed" thereof by the signals through the level controller 99 and the above pulsing circuit 97 actuated by the signals transmitted from the monitor switch 95 and the level transmitter 93.

On the other hand, the slurry concentration is detected by a concentration detector 101 dipped in the slurry tank 91; the concentration signal dispatched from this detector 101 enters a slurry concentration controller 103; and this controller 103 controls the open or close degree of a diluted water controller 105 provided in the passageway for feeding diluted water to the slurry tank 91. That is, the quantity of diluted water is increased or decreased by controlling the open or close degree of the control valve 105.

In the case where the slurry in the cooling tower 5 is subjected to oxidation treatment without passing through the pH-control tank 25 and the oxidation tower 29, the slurry in the cooling tower 5 is circulated through the circulating tank 24 and the line 27, and the pH of the slurry is reduced down to 5 or less. In such a state, the amount of unreacted limestone is reduced, and $CaSO_3.\frac{1}{2}H_2O$ formed according to the above equation (1) by $SO_2$ absorption in the slurry in the cooling tower 5, is consumed as shown in the above equation (2) to form $Ca(HSO_3)_2$ which is easily oxidized. When air is blown by means of a compressor 22 through a valve 20 into the slurry in such a state, oxidation of $Ca(HSO_3)_2$ with air is carried out e.g. according to the above equation (3) or (4) or form gypsum ($CaSO_4.2H_2O$).

Figure 10:
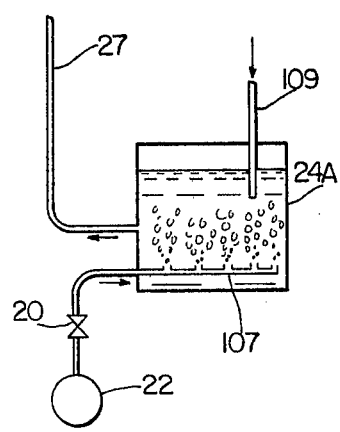
FIG. 10 shows a cross-sectional view of the circulating slurry tank attached to the cooling tower in the process of the present invention, in which tank the oxidation of calcium sulfite is carried out.

A preferable embodiment of a tank in the case where oxidation is carried out in the slurry tank 24 is shown in FIG. 10. In this figure, a tank 24A is provided with an air piping 107 having a plurality of nozzles, at the bottom part thereof, a slurry-introducing pipe 109 led from the cooling tower 5 at one end of the tank 24A and a slurry-discharging pipe 27 at the other end thereof. The piping 107 for air blow-in may be replaced by a piping having downwards directed branches like the piping system of 39A and 81 in FIG. 8.

When the pH of the circulating slurry of the cooling tower 5 is adjusted to 4.5 or less, preferably 3 to 4, gypsum is liable to be formed; hence even when air is not blown in by means of the compressor 22, it is possible to form gypsum from the flue gas by means of air contained in the slurry. In this case, since the oxygen partial pressure in the flue gas is low, gypsum having a larger particle size is formed.

A process of oxidizing calcium sulfite formed inside the slurry-circulating system of the cooling tower without employing the oxidation tower 29 or the compressor 22, and separating gypsum by the use of a liquid cyclone, will be illustrated referring to FIG. 11. Between the cooling tower 5 and the slurry tank 24 is circulated a limestone-containing slurry, through the circulating line 27 by which the tower 5 is connected to the tank 24, by means of a pump 111. As $SO_2$ contained in the flue gas is absorbed in the slurry, the pH of the slurry is reduced to bring about conditions under which gypsum is liable to be formed; thus calcium sulfite formed in the slurry is oxidized by oxygen contained in the slurry to form gypsum. A portion of the circulating slurry containing gypsum is withdrawn through a line 113 and led into a liquid cyclone 45A where gypsum is separated. In this case, the size of the limestone as absorber is 325 meshes 100% pass (44μ or smaller), for example, and the size of calcium sulfite is smaller than the limestone, and also the size of gypsum is larger than the limestone; hence the conditions in the liquid cyclone 45A are controlled so that sizing is carried out around about 50μ. The flow control of the slurry containing gypsum in the line 113 is carried out correspondingly to the change in the amount of flue gas to be treated by controlling a flow control valve 115 located at the inlet of the cyclone 45A. Further, the liquor after gypsum separation, in which limestone and calcium sulfite are contained in admixture, is returned through an overflow piping 117 into the tank 24. The gypsum slurry separated by the cyclone 45A is withdrawn through an underflow piping 119 and stored in the slurry tank 121. When the amount of the gypsum slurry inside the tank 121 has reached a definite amount, the gypsum slurry is sent to the centrifugal separator 53 where the slurry is dehydrated to recover gypsum having a surface water content of 10% or less. This gypsum 127 is carried by a belt conveyer 123 and stored at a separate place. In addition, the discharge water from the centrifugal separator 53 is stored in the discharge water tank 57 and returned into the tanks 24 and 121 through a discharge water piping 125 to control the concentrations of the circulating slurry of the cooling tower and the gypsum slurry. By repeating such a cycle, gypsum is formed.

On the other hand, in the case where the gypsum slurry is obtained through the pH control tank 25 and the oxidation tower 29 (FIG. 1) and is subjected to solid-liquid separation by the liquid cyclone, unreacted limestone particles are not contained so much in the slurry; hence a liquor containing gypsum of smaller particle sizes is discharged from the overflow piping of the cyclone, while a slurry containing gypsum of smaller particle sizes, discharged from the upper part of the liquid cyclone is returned to the absorption tower 7 (FIG. 1), the gypsum concentration in the absorption tower is thereby increased, and also, gypsum formed by oxidation of calcium sulfite in the absorption step crystallizes on the above-mentioned fine particle gypsum contained in the absorber liquor; hence scale trouble brought about by precipitation of gypsum on the inner wall, etc. is prevented, and at the same time gypsum of larger particle sizes is obtained due to the crystallization of gypsum on the above-mentioned fine particle gypsum.

The concentration of the gypsum slurry fed to the centrifugal separator 53 is suitably controlled to be in the range of 15 to 25% by weight. If the slurry concentration exceeds 30% by weight, the slurry causes an uneven collision with the inner surface of the bucket of the centrifugal separator at the time of the liquor feed, resulting in an uneven solid layer on the inner surface. If the slurry concentration is lower than 10%, the formation of the solid layer on the bucket inner surface at the time of the liquor feed is slow and the slurry is agitated inside the bucket, resulting in that a great vibration of the bucket occurs to make it impossible to operate the centrifugal separator stably, and the grade of gypsum or byproducts is lowered such that the water content in the products is increased.

FIGS. 12 and 13 show preferable embodiments of the centrifugal separator 53 employed in the present invention. In these figures, the centrifugal separator 53 is provided with an overflow pipe 129, a discharge water pipe 131 and discharge water duct 133 connected to these pipes. On the other hand, just below the centrifugal separator 53 are arranged a discharge water hopper 135 as a receiving dish for receiving the discharge water at the time of the liquor feed as well as at the time of the dehydration, and a hopper 137 as a receiving dish for receiving the dehydrated material at the time of completion of the dehydration, and these hoppers are connected through a connecting part 139. The hoppers 135 and 137 are devised so as to be acceptable to the respective operations thereof, concretely so as to be able to reciprocate in a reciprocating section 141, and the exit 143 of the discharge water hopper 135 reciprocates along section 141 of the opening part of the discharge water duct 133. This opening part of the discharge water duct 133, opened for the reciprocating motion of the exit 143 of the discharge water hopper 135 is provided with bellows 145A, 145B fixed by means of fittings 147 so as not to harm the function of the exit 143, to thereby prevent vapor leakage.

According to such a construction, the discharge water duct 133 has no opening part and is always closed in spite of the reciprocating motion of the discharge water hopper 135 and the hopper 137; hence there occurs no vapor leakage at the time of discharge of overflow water and dehydration discharge water, and at the time of the liquor feed. In such a manner, moisture leakage around the centrifugal separator is prevented and incomplete actuation of electric instruments due to adhesion of dust as well as rusting of equipments can be prevented, and also wetting of dehydrated material (gypsum) due to dropping thereon of condensed steam is prevented.

A portion of the dehydration discharge water from the centrifugal separator 53 is passed through a hose 149 fixed to a hose-fixing adaptor 151 of the discharge water pipe 131, and spouted from a nozzle 153 located at the bottom part of the discharge water hopper 135 to wash away residue adhered around the bottom part. The dehydration discharge water from the centrifugal separator is continuously fed during the operation; hence washing of the hopper 135 is also continuously carried out.

In FIG. 1, the discharge liquor after separation of the concentrated gypsum slurry in the solid-liquid separator 45 is circulated via the line 47 and its branch 48 into the limestone slurry tank 9. However, when the discharge liquor is circulated and used repeatedly, there is a fear that soluble impurities contained in limestone and soluble components contained in the flue gas are dissolved in the liquor and concentrated to change the properties of the absorber liquor and cause operational troubles such as corrosion due to the increase in chlorine ions. Further, a portion of $(HSO_3)^-$ ions contained in the circulating slurry is converted into dithionic acid ions $S_2O_6^{2-}$ in the presence of Mn, Fe, etc. to change the properties of the absorber slurry. Thus it is necessary to withdraw a portion of the circulating slurry as blow-down water into the discharge water-treating apparatus 49 and subject it to a decomposition treatment for $S_2O_6^{2-}$.

As for such a method for treating $S_2O_6^{2-}$, a method may be employed wherein a strong acid such as sulfuric acid is added to the blow-down water to make its pH 1.5 or lower, followed by heating up to a temperature of 60° C. or higher. Further, a method may also be employed wherein $S_2O_6^{2-}$ ions are absorbed to a weakly-basic anion exchange resin and then subjected to desorption at a pH of 10 or higher, followed by adding a strong acid to make the pH 1.5 or lower and subjecting to thermal decomposition as described above. By carrying out such methods, it is possible to remove $S_2O_6^{2-}$ ions accumulated in the circulating slurry of the absorption tower to thereby prevent the reduction in the $SO_2$ absorption performance of the circulating slurry, and also to avoid a secondary pollution through the treatment of the discharge water containing $S_2O_6^{2-}$ ions. In addition, the exhaust gas containing $SO_2$ formed by the decomposition of $S_2O_6^{2-}$ in the discharge water-treating apparatus 49 may be returned to the flue gas-treating line 1 and cleaned.

What we claim:

1. A limestone-gypsum flue gas desulfurization process comprising:
   a cooling step of cooling and dedusting flue gas containing sulfur oxides ($SO_x$) and producing an effluent;
   an absorption step of contacting the flue gas cooled in said cooling step with a limestone (lime) slurry to absorb and remove the $SO_x$ contained in the gas thereby forming $CaSO_3$ and $CA(HSO_3)_2$ and producing cleaned gas;
   controlling the pH of the resulting slurry containing $CaSO_3$ and $Ca(HSO_3)_2$ formed in said absorption step to less than 5;
   an oxidation step of contacting the resulting slurry from said pH-adjusting step with air to oxidize it and thereby form gypsum wherein the air is supplied in an amount of 1.5 to 3 times the theoretical amount of air;
   a liquid-separation step of concentrating the resulting slurry containing gypsum from said oxidation step to produce clarified water and a gypsum slurry;
   a centrifugal separation step of separating gypsum from the concentrated gypsum slurry to produce gypsum and a filtrate containing fine particles of gypsum;
   adding an ion exchange resin to the separated clarified water to absorb dithionic ions contained in the clarified water followed by desorbing at pH 10; and
   treating the desorbed ions at pH 1.5 or less and heating to at least 60° C. to decompose the dithionic ions.

2. A process according to claim 1 wherein the pH in said pH adjusting step is adjusted to a range of 3.5 to 4.5.

3. A limestone-gypsum flue gas desulfurization which comprises:
   a cooling and absorption step of contacting a high temperature $SO_x$-containing gas with a low temperature limestone (lime) slurry fed from the second step described below, to cool and dedust the gas and to cause the slurry to absorb $SO_x$ in the gas;
   a second absorption step of contacting the gas cooled in the cooling step with a limestone slurry to cause the slurry to absorb $SO_x$ contained in the gas to thereby remove SO from the gas and produce cleaned gas;
   controlling the pH of the slurry leaving the cooling step to less than 5;
   a oxidation step of contacting the slurry led from the pH-adjusting step with air to oxidize the slurry and form gypsum, wherein the air is supplied in an amount 1.5 to 3 times the theoretical amount of air;
   a solid-liquid separation step of concentrating the slurry containing gypsum from the oxidation step to produce a gypsum slurry;
   a centrifugal separation step of separating gypsum from the concentrated gypsum slurry to produce gypsum and filtrate containing small particles of gypsum treating the clarified water separated from the gypsum slurry by adjusting the pH to 1.5 or less and heating to at least 60° C. to decompose dithionic ions.

4. A process according to claim 3 wherein the pH in said pH adjusting step is adjusted to a range of 3.5 to 4.5.

5. A limestone-gypsum flue gas desulfurization process comprising:
   a cooling step of cooling and dedusting flue gas containing sulfur oxides ($SO_x$) and producing an effluent;
   an absorption step of contacting the flue gas cooled in said cooling step with a limestone (lime) slurry to absorb and remove the $SO_x$ contained in the gas thereby forming $CaSO_3$ and $CA(HSO_3)_2$ and producing cleaned gas;
   controlling the pH of the resulting slurry containing $CaSO_3$ and $Ca(HSO_3)_2$ formed in said absorption step to less than 5;
   an oxidation step of contacting the resulting slurry from said pH-adjusting step with air to oxidize it and thereby form gypsum wherein the air is supplied in an amount of 1.5 to 3 times the theoretical amount of air;
   a liquid-separation step of concentrating the resulting slurry containing gypsum from said oxidation step to produce a concentrated gypsum slurry and clarified water;
   a centrifugal separation step of separating gypsum from the concentrated gypsum slurry to produce gypsum and a filtrate containing fine particles of gypsum;
   treating the clarified water separated from the gypsum slurry by adjusting the pH to 1.5 or less and heating to at least 60° C. to decompose dithionic ions.

6. A process according to claim 5 wherein at least one of $CaCO_3$ and $Ca(OH)_2$ is added to a portion of the effluent produced in said cooling step and then is mixed with a portion of the concentrated gypsum slurry obtained in said solid-liquid separation step to obtain a low grade of gypsum.

7. A process according to claim 5, wherein water is used to cool the gas in the cooling step and the effluent produced in the cooling step comprises water, said effluent being further subjected to treatments comprising:
   a step to remove dust; and
   a step to remove heavy metals through settling separation by means of pH adjustment.

8. A process according to claim 5, wherein sodium carbonate is added to the clarified water from the liquid separation step to soften the clarified water.

9. A process according to claim 5, wherein a portion of at least one of the resulting slurry from the oxidation step and the concentrated gypsum slurry is supplied to the slurry in the absorption step.

10. A process according to claim 5 wherein the filtrate is supplied to the slurry in the absorption step so that the gypsum slurry in the absorption slurry is at least 5% by weight.

11. A limestone-gypsum flue gas desulfurization process which comprises:

a. cooling and absorption step of contacting a high temperature $SO_x$-containing gas with a low temperature limestone (lime) slurry fed from the second step described below, to cool and dedust the gas and to cause the slurry to absorb $SO_x$ in the gas;

a second absorption step of contacting the gas cooled in the cooling step with a limestone slurry to cause the slurry to absorb $SO_x$-contained in the gas to thereby remove $SO_x$ from the gas and produce cleaned gas;

controlling the pH of the slurry leaving the cooling step to less than 5;

an oxidation step of contacting the slurry led from the pH-adjusting step with air to oxidize the slurry and form gypsum, wherein the air is supplied in an amount 1.5 to 3 times the theoretical amount of air;

a solid-liquid separation step of concentrating the slurry containing gypsum from the oxidation step to produce a concentrated gypsum slurry and clarified water;

a centrifugal separation step of separating gypsum from the concentrated gypsum slurry to produce gypsum and filtrate containing small particles of gypsum;

a step wherein the filtrate is supplied to the slurry in the absorption step so that the gypsum concentration in the absorption slurry is at least 5% by weight;

treating the clarified water separated from the gypsum slurry by adjusting the pH to 1.5 or less and heating to at least 60° C. to decompose dithionic ions.

12. A process according to claim 11, wherein sodium corbonate is added to the clarified water from the liquid separation step to soften the clarified water.

13. A process according to claim 11, wherein a portion of at least one of the resulting slurry from the oxidation step and concentration gypsum slurry is supplied to the slurry in the absorption step.

14. A process according to claim 11 wherein the filtrate is supplied to the slurry in the absorption step so that the gypsum slurry in the absorption slurry is at least 5% by weight.

15. A process according to claim 5, wherein, after the liquid-separation step, the concentration of the gypsum slurry is adjusted to a range of 10% to 30% by weight.

16. A process according to claim 11, wherein, after the liquid-separation step, the concentration of the gypsum slurry is adjusted to a range of 10% to 30% by weight.

17. A process according to claim 15 or 16 wherein the step of adjusting the concentration of the concentrated gypsum slurry is carried out by detecting the gypsum concentration in the slurry by means of a concentration detector for the slurry and controlling the amount of the concentrated slurry led from the solid-liquid separation step and the amount of diluting water, based on the signal transmitted by the concentration detector.

18. A process according to claim 15 or 16 wherein the concentration of the concentrated gypsum slurry is adjusted to within the range of 15% to 25% by weight of gypsum.

19. A process according to claim 5 or 11 wherein the pH of the slurry treated in said oxidation step is detected and the pH is controlled based on the signal dispatched from the detection.

20. A process according to claim 5 or 11 wherein a centrifugal separator is employed in the centrifugal separation step, which separator is provided with a discharge water hopper as a receiving dish and a discharge water duct, said discharge water hopper having its opening.

21. A process according to claim 20 wherein the discharge water hopper is provided at its bottom part with water-spouting nozzles directed upwards, said nozzles being provided with discharge water from the centrifugal separator.

22. A process according to claim 5 or 11 wherein an oxidation tower is utilized in the oxidation step, which tower is provided with at least one atomizer having a conical rotor at the lower part thereof.

23. A process according to claim 22, wherein air pressure inside the oxidation tower is in the range of 1.5 to 2 atmospheres.

24. A process according to claim 5 or 11 wherein an oxidation tower is utilized in the oxidation step, to which tower is connected an urgent blow tank provided with fluid-spouting nozzles in the vertical direction, directed toward the bottom part of the tank.

25. A process according to claim 5 or 11 wherein water is added in the oxidation step to limit an increase in the slurry temperature due to the oxidation reaction of calcium sulfate.

26. A process according to claim 25 wherein the water content in the slurry inside the oxidation tower is adjusted to within the range of 92% to 94% by weight.

27. A process according to claim 25, wherein the water added in the oxidation step comprises the filtrate produced in the centrifugal separation step.

28. A process according to claim 5 or 11 wherein a thickner is employed as a solid-liquid separator for the solid-liquid separation step.

29. A process according to claim 5 or 11, wherein a liquid cyclone is employed as a solid-liquid separator for the solid-liquid separation step.

30. A process according to claim 1 or 2 wherein the flue gas is high temperature flue gas and the cleaned gas from the absorption step is reheated by subjecting the cleaned gas to heat exchange between the cleaned gas and the high temperature flue gas fed to the cooling step, by means of a heat exchanger provided with heat pipes.

31. A process according to claim 30 wherein the heat pipes are separately arranged to form those on the higher temperature side and those on the lower temperature side.

* * * * *